United States Patent [19]

Misher et al.

[11] Patent Number: 4,638,982
[45] Date of Patent: Jan. 27, 1987

[54] VEHICLE SEAT MONITORING MEANS

[75] Inventors: Hans-Peter Misher, Bad Meinberg; Helge Pietsch, Detmold, both of Fed. Rep. of Germany

[73] Assignee: Gebr. Isringhausen, Lemgo, Fed. Rep. of Germany

[21] Appl. No.: 596,252

[22] Filed: Apr. 3, 1984

[30] Foreign Application Priority Data

Apr. 7, 1983 [DE] Fed. Rep. of Germany ....... 3312732

[51] Int. Cl.$^4$ .......................... A47C 7/14; F16M 13/00
[52] U.S. Cl. ..................................... 267/131; 248/550; 318/467
[58] Field of Search .......................... 267/117, 131, 133; 248/550; 114/194; 297/345; 324/207, 208, 226; 318/467, 568; 188/161; 310/12; 296/65 R

[56] References Cited

U.S. PATENT DOCUMENTS

| | | | |
|---|---|---|---|
| 4,198,025 | 4/1980 | Lowe et al. | 248/550 |
| 4,264,849 | 4/1981 | Fleischer et al. | 318/568 |
| 4,397,440 | 8/1983 | Hall et al. | 248/550 |
| 4,461,444 | 7/1984 | Grassl et al. | 248/550 |

FOREIGN PATENT DOCUMENTS 0130766  8/1983  Japan ..................... 310/12

Primary Examiner—George E. A. Halvosa
Assistant Examiner—Robert J. Oberleitner
Attorney, Agent, or Firm—Salter & Michaelson

[57] ABSTRACT

A device for monitoring the operation of pneumatic seats for vehicles, the seats being supported by a pneumatically-operated spring to give a resilient seat mounting.

The monitoring device operates at the commencement of use of the seat and also during use of the seat in case of possible leaks of air.

Sensing elements are located at positions above and below a rated central position and are actuated according to movements of the seat from the centralposition. Actuation the sensing elements provides signals for a counter device which when an upper or lower limiting value is reached automatically resets itself to a starting value between the two limiting values and emits a control signal corresponding to the limiting value reached. The control signal operates an air valve for a predetermined length of time to supply air to or discharge air from the pneumatic spring.

9 Claims, 3 Drawing Figures

VEHICLE SEAT MONITORING MEANS

This invention relates to vehicle seats and in particular to monitoring means for vehicle seats which are supported by means of a pneumatically-operated spring to provide a resilient mounting of the seat. Such seats are generally called pneumatic seats.

Pneumatic seats have hitherto generally included a pneumatically-operated spring to which air is introduced and removed on a closed system in which the pneumatically-operated spring is set to take account of the weight of the user each time the user takes up a position on the seat. The spring is then closed to the admission and exhaust of air during the period of use of the seat. Such an arrangement has the disadvantage that the user is inaccurately located at the rated central position of the seat. This is due to the fact that the user usually assumes the seated posiion when the vehicle is at rest whereas during vehicle motion the frictional forces and the damping of the resilient system differ from those when the vehicle is at rest.

It has been proposed to regulate the setting of the rated central position of the vehicle seat automatically after a time delay such that it can be assumed the vehicle is in motion when setting takes place. Such a proposal will not always be satisfactory. As an additional solution it has been proposed that the time delay period can be reset by the user by operation of a press button but this is under the care of the user and will not always be undertaken.

A further problem arises due to air losses caused by leaks in closed air systems. Such leaks will give rise to deviations from the rated central position and the deviations will become increasingly large and will not usually be recognised by the user until this is too late.

An object of the invention is to provide improved means for monitoring the position of a vehicle seat with respect to the rated central position not only when the seat is first occupied but thereafter, and without the user being called upon to effect adjustment and maintenance in relation to the rated central position.

According to the invention vehicle seat monitoring means for vehicle seats which are movably supported by pneumatic springs, comprises a pneumatic spring, an air valve whereby air is admitted to and discharged from the pneumatic spring, sensing means for sensing upper and lower positions of the seat above and below a central position and for transmitting electrical signals according to the positions sensed, and a differential counter for receiving said electrical signals, and the counter, when a signal corresponding to an upper or lower position is received, sets itself to a starting value between values at said upper and lower positions and transmits a control signal related to the upper or lower value to the air valve to actuate the valve for a predetermined time to admit air to or discharge air from the pneumatic spring.

Preferably the upper and lower values of the counter are adjustable.

The invention provides means, at relatively low cost, which gives a permanent monitoring system not susceptible to interference regarding the maintenance of the rated central position of the associated vehicle seat. The sensing means for sensing upper and lower positions of the seat relative to the rated central position detect movements of the seat from the rated central position and transmit corresponding electrical signals to the counter. The counter is a forward-backward or differential counter and in one arrangement adds up the movements above the central position and subtracts movements below the central position. As a result the vehicle seat, which is correctly adjusted in relation to the rated central position over a predetermined time period, will not change the prevailing starting value of the counter because on average the sum of the movements above the central position will equal the sum of the movements below the central position.

In the case in which the rated central position is incorrectly adjusted, for example due to an incorrect original setting or due to the leakage of air during use, the sum of the movements to one side of the central position will be larger than the sum of the movements to the other side and the counter will approach a limiting value which is established. In this case the counter will generate a control signal to switch on the air valve for the pneumatic spring for a predetermined time according to the deviations from the central position and air is either supplied to or discharged from the spring, thereby correcting a deviation from the central position.

The operation of the monitoring means can be easily adjusted to suit the vehicle concerned or the road conditions. In addition adjustment according to the nature of the associated seat can be made at any time. Thus, for example the sensing means for sensing upper and lower positions of the seat can sense positions closely adjacent the central position or positions more remote from said central position. With positions more remote from the central position smaller movements about the central position are not sensed so that the correctional action becomes more sluggish and less exact. The correctional action can also be influenced by adjustment of the duration of the air supply to or from the valve and the shorter this duration the more accurately will the rated central position be determined. A further possiblity is adjustment of the limiting values of the differential counter by which the inertia and the accuracy of the monitoring means can be altered.

The monitoring means is capable of correct adjustment of the rated central position permanently and without the need for corrections to be carried out continuously. Corrections only occur when for some reason the vehicle seat deviates continuously from the prescribed central position. When the vehicle seat moves about its central position satisfactorily the predetermined limiting values of the differential counter are not reached and the air valve remains closed in the desired manner.

Conveniently the monitoring means includes a capacitor for receiving the electrical signals from the sensing means, the signals differing in voltage levels according to whether an upper or a lower position is sensed, and an amplifier connected to the capacitor, and upon a predetermined value of voltage being reached by the capacitor the amplifier is actuated to transmit a control signal to the air valve to operate the air valve. Such an arrangement is robust and simple and operates in an analogue manner.

Digital forms of the monitoring means can also be arranged and in one embodiment the monitoring means comprises a digital counter to which counting pulses are transmitted by the sensing means, and control means for setting the counter to a starting value between two limiting values when a predetermined limiting value of the count has been reached, the air valve being actuated in accordance with the limiting value reached.

The sensing means may include simple contact switches above and below said central position but capacitance switches are preferred in order to give wear-free operation. Conveniently the sensing means comprise upper and lower reed switches actuated by a permanent magnet. Resistances sensitive to a magnetic field can be used instead of the reed switches.

It is possible to employ the monitoring means for the initial adjustment of the vehicle seat relative to the weight of any particular user or to the rated central position. In such an arrangement the monitoring means may comprise a control member which after initiation of a feed voltage bridges over the differential counter and converts signals from the sensing means into coordinated control signals transmitted directly to the air valve and which, after two voltage drop pulses from the sensing means, switches on the differential counter and transmits no further signals to the air valve. By this arrangement rapid adjustment of the seat to its rated central position is achieved when the seat is brought into use or when the user is changed. Such adjustment is achieved by putting out of action the differential counter for a certain time so that the signals from the sensing means are used as direct control signals to the air valve. Thus air is supplied to or discharged from the pneumatic spring for a period of time which lasts until the sensing means indicates that a seat position has been reached which is in the region of the rated central position.

The switching state of the monitoring means corresponding to the rapid adjustment made is basically equivalent to the voltage free state of the monitoring means, after initiation of the supply voltage. Switching on of the supply voltage may be when the ignition key of the vehicle is operated, when a manually-operated push button is used, or by means of a seat switch operated automatically when the user occupies the seat. In each case the rapid adjustment feature is actuated first by bridging across the differential counter.

As soon as the control member registers two voltage decrease pulses from the sensing means the differential counter is brought into operation, as previously described, and direct transmission of signals from the sensing means to the air valve ceases. Permanent monitoring of the rated central position of the seat then comes into operation, as previously described.

The switching-off of the rapid adjustment made after two voltage decrease pulses (opening pulses) by the sensing means is important in the case in which the seat becomes unloaded and moves to its uppermost position due to the internal pressure in the pneumatic spring. In this position the sensing means sensing the upper position of the seat is actuated and generates a signal, that is, it is switched to a closed position. The sensing means for the upper position is switched to an open position as soon as the user occupies the seat and presses the seat down towards the central position. However a heavier user will, due to a low pressure in the pneumatic spring, cause the seat to move downwards beyond the central position until the sensing means senses the lower position of the seat and signals the reaching of said lower position, that is, it is switched to a closed position. Air will be supplied to the pneumatic spring and the seat will be raised towards the central position and the signal will cease by switching to an open position, that is, the second voltage drop pulse will have been produced.

An embodiment of the invention will now be described by way of example only and with reference to the drawings, in which.

Figure 1:
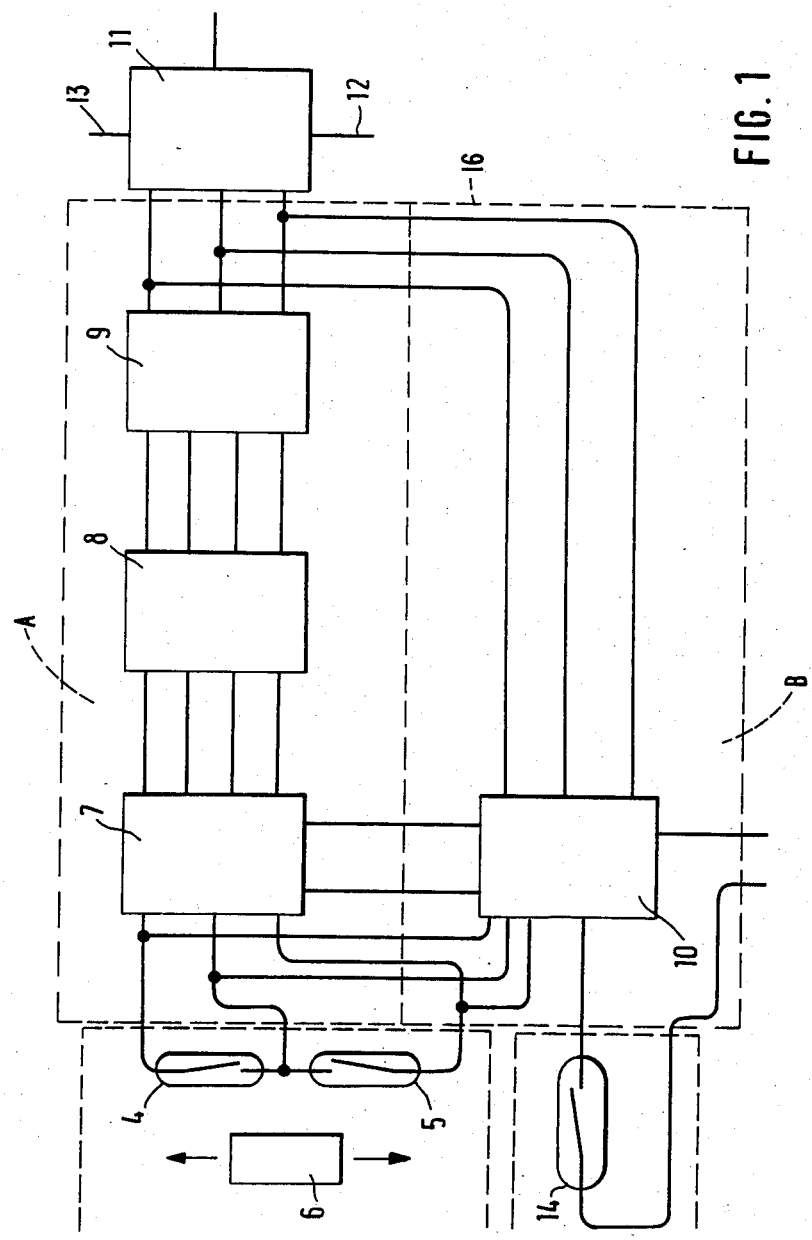
FIG. 1 is a schematic circuit diagram of monitoring means for a pneumatic seat.

Referring to the drawings and firstly to FIG. 1 the monitoring means includes an upper sensing device 4 located above a rated central position of the seat and a lower sensing device 5 arranged below said central position. The devices 4 and 5 which are illustrated diagrammatically in FIG. 1 to demonstrate the relative vertical positions thereof are arranged to be actuated by a permanent magnet 6, the magnet 6 moving with the vehicle seat (FIG. 2) during reciprocating movements of the seat in use.

The monitoring means circuit includes a regulation circuit A having a capacitor 7, an operational amplifier 8 and a timer 9. A control circuit B includes a control member 10. The regulation and control circuits A and B operate an air valve 11 which controls the supply of air to and from a pneumatic spring 15 (FIG. 2) through a discharge conduit 12 and a supply conduit 13. The valve 11 is supplied with air from a source of compressed air (not shown).

When the sensing means 4 is actuated and closed by the magnet 6, the capacitor 7 is electrically charged. Discharge of the capacitor is caused when the sensing means 5 is actuated and closed. The amplifier 8 detects the instantaneous voltage of the capacitor 7 and when a predetermined limiting value of voltage level across the capacitor is reached the amplifier 8 actuates a magnetically-operated air valve 11 through the timing circuit 9 for a predetermined time and the capacitor 7 is brought to a potential value lying between two predetermined limiting voltage values.

A contact switch 14 is provided operated, for example, by the user taking up a position on the vehicle seat, and the switch 14 serves to actuate the control circuit B to effect rapid adjustment of the seat to the rated central position. Upon operation of the switch 14 an electrical supply to the control member 10 is initiated so that the control member bridges across or short circuits the capacitor 7 and converts signals from the sensing means 4 or 5 to corresponding control signals fed directly to the air valve 11.

The sensing means 4 and 5 as shown in FIG. 1 are illustrated diagrammatically in an upper and lower position, the position between said sensing means 4 and 5 defining the rated central position of said seat. The sensing means are preferably in the form of reed switches opened and closed by movement of the magnet 6 adjacent the switches.

Figure 2:
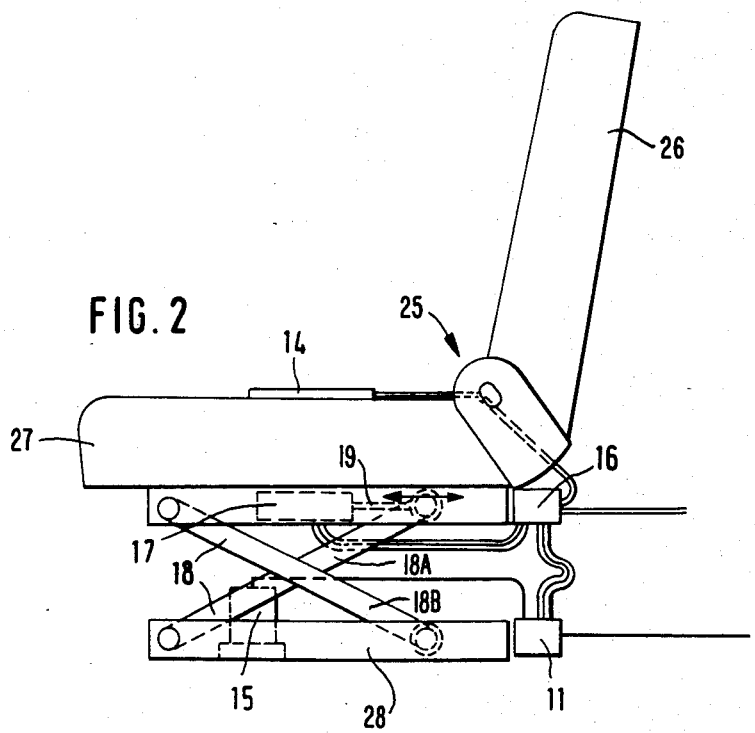
FIG. 2 is a schematic side elevation of a pneumatic seat having the monitoring means of FIG. 1.

Referring now to FIG. 2 this shows a conventional pneumatic seat into which the monitoring means of FIG. 1 is incorporated. A vehicle seat 25 has a back rest 26 and a lower support member 27 on which is carried the seat 25. the seat 25 is mounted on a scissors linkage 18 carried on a base member 28 secured to the vehicle. A pneumatic spring 15 mounted on the base member 28 engages the scissors linkage 18 to control pivoting of the linkage 18 and provide a resilient support for the seat. The linkage 18 comprises pairs of links 18A and 18B one end of one 18A of which is pivotally attached to the base member 28 and the other end is movably guided horizontally relative to the seat 25. The other links 18B are pivotally attached to the seat 25 at one end and are movably guided relative to the base member 28 at the other end, all in known manner.

The air valve 11 is conveniently mounted on the vehicle to control the supply of air to and from the spring 15 and the circuitry described with reference to FIG. 1 is located in a housing 16 mounted on a rear part of the seat 25 and is supplied by an electrical power source (now shown).

Figure 3:
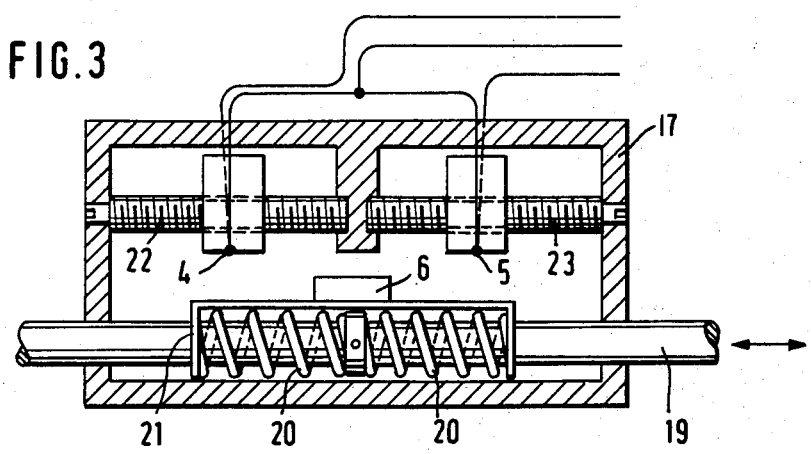
FIG. 3 is a cross-sectional view of part of the monitoring means of FIGS. 1 and 2.

The sensing means 4 and 5 are mounted on the underside of the support member 27 in a housing 17, shown in more detail in FIG. 3.

The link 18A at its upper, movable end is attached to a push rod 19, seen more clearly in FIG. 3, and the push rod 19 is moved horizontally during movement of the seat 25 relative to the base member 28.

The push rod 19 enters the fixed housing 17 and carries, within the housing 17, a yoke 21 on which is mounted the permanent magnet 6. Equalising springs 20 are interposed between the rod 19 and the yoke 21.

As shwon in FIG. 3 the magnet 6 is in its rest position and movement of the rod 19 causes the magnet to be moved in one direction or the other from the rest position.

The hosuing 17 also incorporates the sensing devices 4 and 5 carried on adjustable spindles 22 and 23 adjacent the path of movement of the magnet 6 for actuation thereby.

The push rod 19, yoke 21 and springs 20 are arranged so that after the magnet 6 has reached a position of actuation relative to the sensing means 4 or 5 it cannot be moved past such position even when larger movements of the rod 19 take place.

Independent adjustment of the positions of the sensing means 4 and 5 can be effected by rotation of the spindles 22 and 23 by an adjustment tool (not shown) entering the ends of the spindles.

What is claimed is:

1. A vehicle seat monitoring means for an assembly that includes a vehicle seat, a base member, linkage means mounted on said base member and interconnected to said vehicle seat for effecting vertical movement thereof, a pneumatic spring engaging said linkage means for controlling the movement thereof and providing a resilient support for said vehicle seat, and an air valve for controlling admission and discharge of air to and from said pneumatic spring, the improvement comprising first and second sensing devices located at spaced positions above and below a predetermined rated central position of said vehicle seat, respectively, and being responsive to vertical oscillatory movement of said seat, for emitting electrical signals which differ from each other with respect to the direction of vertical movement of said seat as sensed by said sensing devices, a counter means for receiving and summing said electrical signals from said sensing devices, said counter means having a predetermined starting value, a first predetermined limiting value corresponding to a condition wherein the sum of the signals received from said first and second sensing devices is a predetermined amount greater than said starting value and a second predetermined limiting value corresponding to a condition wherein the sum of the signals received from said first and second sensing devices is a predetermined amount less than said starting value, said counter summing said signals from said sensing devices until one of said limiting values is reached, whereupon the counter means is reset to said starting value and emits an electrical control signal to said air valve, said air valve being responsive to said electrical control signal emitted by said counter means for operating said pneumatic spring to position said seat at the rated central position thereof.

2. Monitoring means according to claim 1, wherein the limiting values of the counter means are adjustable.

3. Monitoring means according to claim 1 wherein the air valve is actuated for a predetermined time which is adjustable in duration.

4. Monitoring means according to claim 1 comprising a capacitor for receiving the electrical signals from the sensing devices, the signals differing in voltage levels according to the sensing of the predetermined limiting value as reached, and an amplifier connected to the capacitor, and being actuated by said capacitor when a predetermined value of voltage is reached thereby to transmit a control signal to the air valve to operate the air valve.

5. Monitoring means according to claim 1, said counter means being defined by a counter to which counting pulses are transmitted by the sensing devices, and control means for resetting the counter to a starting value between the two limiting values when one of the limiting values of the counter has been reached, the air valve thereafter being actuated in accordance with the limiting value reached.

6. Monitoring means according to claim 1 comprising a control member which, after initiation of a feed voltage, bridges over the counter means and converts signals from the sensing devices into coordinated control signals transmitted directly to the air valve and which after two voltage drop pulses from the sensing devices switches on the counter means and transmits no further signals to the air valve.

7. Monitoring means according to claim 1 said sensing devices comprising upper and lower reed switches, and a permanent magnet movable with said seat for actuating said reed switches.

8. Monitoring means according to claim 7 wherein the permanent magnet is mounted for displacement by movement of the vehicle seat between a rest position and positions in which the reed switches are actuated.

9. Monitoring means according to claim 1 in which the positions of the sensing devices are adjustable relative to the central position.

* * * * *